Figure 1:
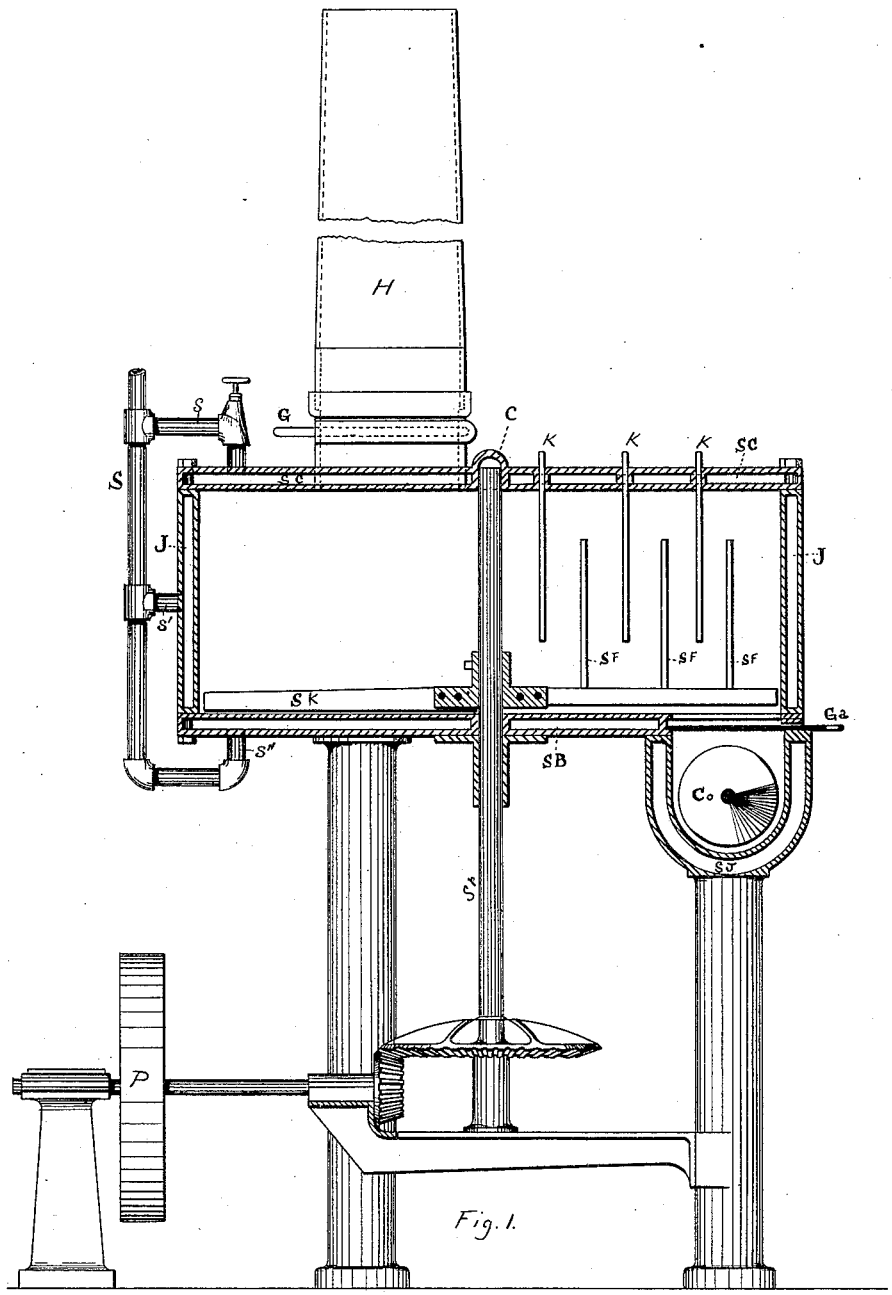

(No Model.)　　　　　　　　　　　　　　2 Sheets—Sheet 1.
J. S. PRICE.
COTTON SEED MEAL HEATER.

No. 428,134.　　　　　　　　Patented May 20, 1890.

Witnesses　　　　　　　　　　　　　　Inventor (No Model.) 2 Sheets—Sheet 2.
J. S. PRICE.
COTTON SEED MEAL HEATER.
No. 428,134. Patented May 20, 1890.
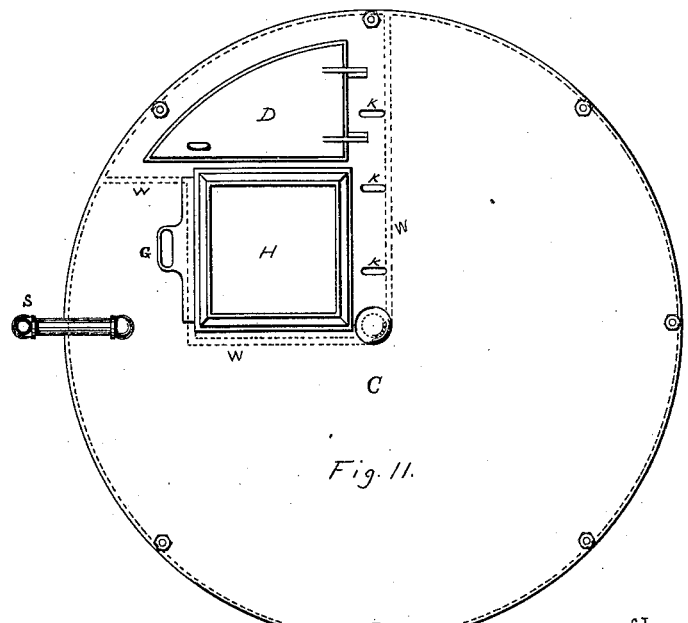
Fig. II.
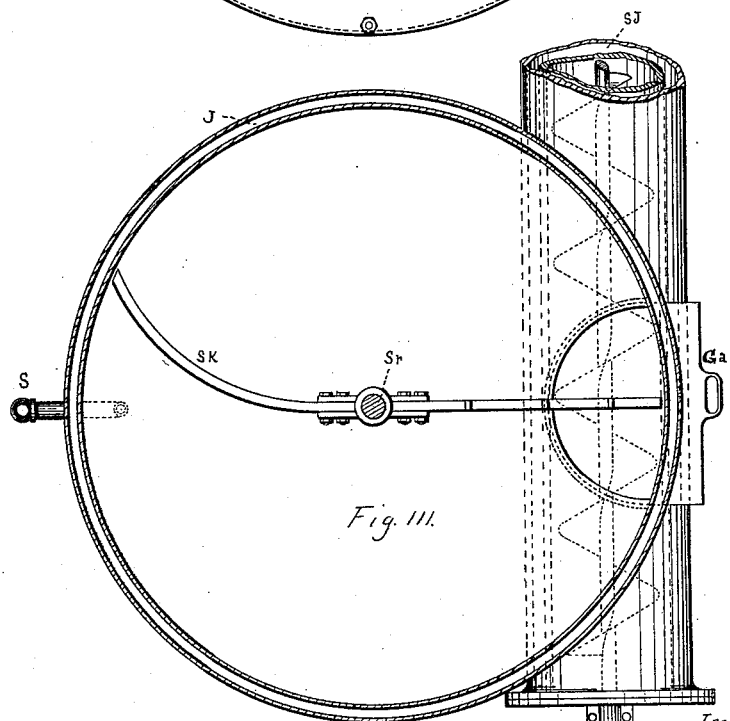
Fig. III.
Witnesses  
Wm. F. Gray  
E. W. ...
Inventor  
James Sterling Price

UNITED STATES PATENT OFFICE.

JAMES STERLING PRICE, OF HOUSTON, TEXAS.

COTTON-SEED-MEAL HEATER.

SPECIFICATION forming part of Letters Patent No. 428,134, dated May 20, 1890.

Application filed October 30, 1889. Serial No. 328,643. (No model.)

*To all whom it may concern:*

Be it known that I, JAMES STERLING PRICE, a citizen of the United States, residing at Houston, in the county of Harris and State of Texas, have invented a new and useful Cotton-Seed-Meal Heater, of which the following is a specification.

My invention relates to improvements in cotton-seed-meal heaters, in which rotating arms or stirrers agitate the meal while it is being heated by steam contained between the walls of the heater.

In the process of extracting oil from cotton-seed meal it is found to be most easily done when the meal is at a temperature of about 212°.

The object of my invention is to provide means to communicate as much heat as possible to the meal contained in the heater in as short a time as possible, and to retain the heat in the meal until it has all been used in forming the cakes. To this end I provide the double-walled or jacketed heater with a double-walled cover having a steam-space and formed with feed or stock hopper and a gate and a hand-door, the steam-space being walled off from the aperture of the hopper and hand-door.

A suitable apparatus for carrying this invention into effect is illustrated in the accompanying drawings, in which—

Figure I is a sectional view of one entire heater; Fig. II, a top view of the cover, and Fig. III a horizontal section of the heater.

The meal is fed into the stock-hopper H. When sufficient meal has accumulated, the gate G is opened and the meal falls into the heater, where it is stirred about by the arms S F S F and the scraper S K, at the same time receiving heat from the steam contained in the space between the walls of the heater. After being sufficiently cooked the gate G *a* is opened and the meal is forced by the scraper S K down into the spiral conveyer-box C *o*, where it is conveyed to the cake-former.

It is customary to steam-jacket the conveyer, as shown at S J.

Bars or knives of metal K K are frequently allowed to project and hang through slots in the cover to further help to break up and separate the meal. In my apparatus, as shown, these bars act in conjunction with the arms S F, rising from the scraper S K, and which are adapted to pass between the former. By this arrangement a thorough agitation and breaking up of the mass is effected, inasmuch as the arms S F positively force the mass against bars K K.

The heater proper is usually made in three castings—the bottom S B, (to which are attached the supports or legs,) the cylindrical shell J, and the cover S C. These three are bolted firmly together, and the meal and revolving knives are contained in the cylindrical space bounded by these three castings. The entire heater may be further protected from radiating its heat by a felt or other suitable jacket.

The steam-pipe S connects by branch pipes $s$, $s'$, and $s''$, respectively, with the steam-spaces of the cover S C, shell J, and bottom S B, for supplying steam to heat the three sections composing the heater.

In Fig. II is shown the position on the cover of the openings for the stock-hopper H and the hand-door D in one quarter of the cover. As these two openings extend into the heater, the steam-space S C must be walled off from these openings. This is done in the casting by the web shown in dotted line at W W.

What I claim is—

1. In combination with a cotton-seed-meal heater, a steam-jacketed cover provided with openings for the feed-hopper H, the hand-door D, and slots for the bars or knives K, all extending through the steam-space of such cover, substantially as and for the purpose described.

2. A cotton-seed-meal heater composed of three steam-jacketed sections or castings—viz., the bottom S B, shell J, and cover S C—all bolted together and connected by steam-supply pipe S and branches $s$, $s'$, and $s''$, substantially as and for the purpose described.

JAMES STERLING PRICE.

Witnesses:
WM. F. GRAY,
E. M. TALIAFERRO.